United States Patent
Hoffman et al.

(10) Patent No.: US 11,783,308 B2
(45) Date of Patent: Oct. 10, 2023

(54) METHOD AND SYSTEM FOR IMPLEMENTING AN ELECTRONIC EXCHANGE FOR BILL PAY TRANSACTIONS

(71) Applicant: JPMorgan Chase Bank, N.A., New York, NY (US)

(72) Inventors: Stephen Hoffman, Batavia, IL (US); Sejdo Radoncic, Bronx, NY (US); Tiffany Ashley Wan, New York, NY (US); Amy M. Leslie, Ann Arbor, MI (US); John L. Biloz, Wonder Lake, IL (US); Raghvendra Singh, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/788,396

(22) Filed: Feb. 12, 2020

(65) Prior Publication Data
US 2020/0258062 A1    Aug. 13, 2020

Related U.S. Application Data

(60) Provisional application No. 62/804,429, filed on Feb. 12, 2019.

(51) Int. Cl.
*G06Q 20/10*    (2012.01)
*G06Q 40/02*    (2023.01)

(52) U.S. Cl.
CPC ......... *G06Q 20/102* (2013.01); *G06Q 20/108* (2013.01); *G06Q 40/02* (2013.01)

(58) Field of Classification Search
CPC ..... G06Q 20/102; G06Q 20/108; G06Q 40/02
(Continued)

(56) References Cited

U.S. PATENT DOCUMENTS

2010/0161466 A1*  6/2010  Gilder ............... G06Q 40/12
                                                    705/40
2015/0170231 A1*  6/2015  Kitchen ........... G06Q 20/0855
                                                    705/34
(Continued)

FOREIGN PATENT DOCUMENTS

AU         2012268872 A1 *  1/2013   ............. G06Q 10/10

OTHER PUBLICATIONS

Fairchild, Aiea, Value Positions for Financial Institutions in Electronic Bill Presentment and Payment (EBPP), 2002, IEEE Computer Society, 0-7695-1874-5703. pp. 1-10 (Year: 2002).*

*Primary Examiner* — Ambreen A. Alladin
(74) *Attorney, Agent, or Firm* — GREENBLUM AND BERNSTEIN, P.L.C.

(57) ABSTRACT

The invention relates to a system that implements an electronic exchange for bill pay transactions. The system comprises an electronic exchange network coupled to an electronic input, a memory component and a computer processor configured to perform the steps of: receiving electronic data files and payment files from a plurality of disparate bill payors; distributing data and funds to each participating lockbox provider file; creating an image of each transaction in the form of a non-negotiable check; creating image files for each lockbox provider participant from a plurality of lockbox provider participants, wherein each image file is indexed to each data file; consolidating image files, data files and payment files into an electronic package for each lockbox provider participant; and transmitting the electronic package to a respective lockbox provider participant.

20 Claims, 5 Drawing Sheets

(58) Field of Classification Search
USPC .......................................................... 705/40
See application file for complete search history.

(56) References Cited

U.S. PATENT DOCUMENTS

| 2016/0048813 A1* | 2/2016 | Mauller | ................. | G06Q 40/12 |
| | | | | 705/30 |
| 2016/0048927 A1* | 2/2016 | Mauller | ................. | G06Q 40/10 |
| | | | | 705/30 |

* cited by examiner

METHOD AND SYSTEM FOR IMPLEMENTING AN ELECTRONIC EXCHANGE FOR BILL PAY TRANSACTIONS

CROSS REFERENCE TO RELATED APPLICATIONS

The application claims priority to U.S. Provisional Application 62/804,429, filed Feb. 12, 2019, the contents of which are incorporated herein in its entirety.

FIELD OF THE INVENTION

The invention relates generally to a method and system for implementing an electronic exchange for bill pay transactions destined for paper lockboxes.

BACKGROUND OF THE INVENTION

Each year, tens of millions of bill pay transactions start out as a digital payment transaction, but turn into a check that is mailed from a bank and commercial bill payers out to billers. These billers receive their checks via an in-house lockbox or one operated by Banks or third party providers. This transaction costs the billers and the industry 10 times more than if the payment were routed electronically. Because there are several root causes to why a bill pay transaction turns into a check, this problem is not going away anytime soon. Current solutions require each client to adopt and make changes to their back office systems. However, these solutions involve extensive time and resources for industry participants.

These and other drawbacks currently exist.

SUMMARY OF THE INVENTION

According to one embodiment, the invention relates to a system for implementing an electronic exchange for bill pay transactions. The system comprises: an electronic input in communication with a plurality of disparate bill payors; and an electronic exchange network coupled to the electronic input, a memory component and a computer processor configured to perform the steps of: receiving electronic data files and payment files from the plurality of disparate bill payors; distributing data and funds to each participating lockbox provider file; creating an image of each transaction in the form of a non-negotiable check; creating image files for each lockbox provider participant from a plurality of lockbox provider participants, wherein each image file is indexed to each data file; consolidating image files, data files and payment files into an electronic package for each lockbox provider participant; and transmitting the electronic package to a respective lockbox provider participant.

According to another embodiment, the invention relates to a method for implementing an electronic exchange for bill pay transactions. The method comprises the steps of: receiving, via an electronic input of an electronic exchange network, electronic data files and payment files from the plurality of disparate bill payors; distributing, via a computer processor, data and funds to each participating lockbox provider file; creating, via the computer processor, an image of each transaction in the form of a non-negotiable check; creating, via the computer processor, image files for each lockbox provider participant from a plurality of lockbox provider participants, wherein each image file is indexed to each data file; consolidating, via the computer processor, image files, data files and payment files into an electronic package for each lockbox provider participant; and transmitting, via the electronic exchange network, the electronic package to a respective lockbox provider participant.

A method of an embodiment of the present invention may be conducted on a specially programmed computer system comprising one or more computer processors, mobile devices, electronic storage devices, and networks.

The computer implemented system, method and medium described herein can provide the advantages of improved bill pay processing. The various embodiments of the present invention achieves benefits and advantages for customers as well as financial institutions and lockbox operators. An embodiment of the present invention is directed to an Electronic Exchange that transforms lockbox operations into digital transactions. As a result, bill pay checks that are currently being printed, mailed, received, opened, extracted, data captured and reconciled manually would be eliminated or substantially minimized. The Electronic Exchange of an embodiment of the present invention improves timeliness of clients getting paid for services and significantly decreases costs of paper, postage and processing time. In addition, billers, namely lockbox clients, do not have to change their systems or sign up for a lockbox processing service. Moreover, the Electronic Exchange does not require end user clients to sign up for or opt into a cost reducing offering. The Electronic Exchange further improves quality, avoids manual mistakes and improves rates of reconciliation. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to creating a digital exchange of data among industry providers for bill pay and lockbox transactions. An embodiment of the present invention is directed to creating an electronic exchange process so that lockbox clients' experience is not changed and requires minimal to no intervention from these clients. According to an exemplary scenario, a financial institution may provide and maintain the electronic exchange. For example, a financial institution or other entity may commercialize participation in the exchange and fund it via maintenance fees as well as discounted transaction fees. This application relates to U.S. Provisional Application 62/854,567, filed May 30, 2019, the contents of which are incorporated by reference herein in its entirety.

In addition, an embodiment of the present invention provides an ability to market to commercial providers who are not considered major players in the industry and also to corporate clients who process their own checks in-house. According to an embodiment of the present invention, Blockchain may be applied to improve security so that the system may be less reliant on current payment processing rails.

Figure 1:
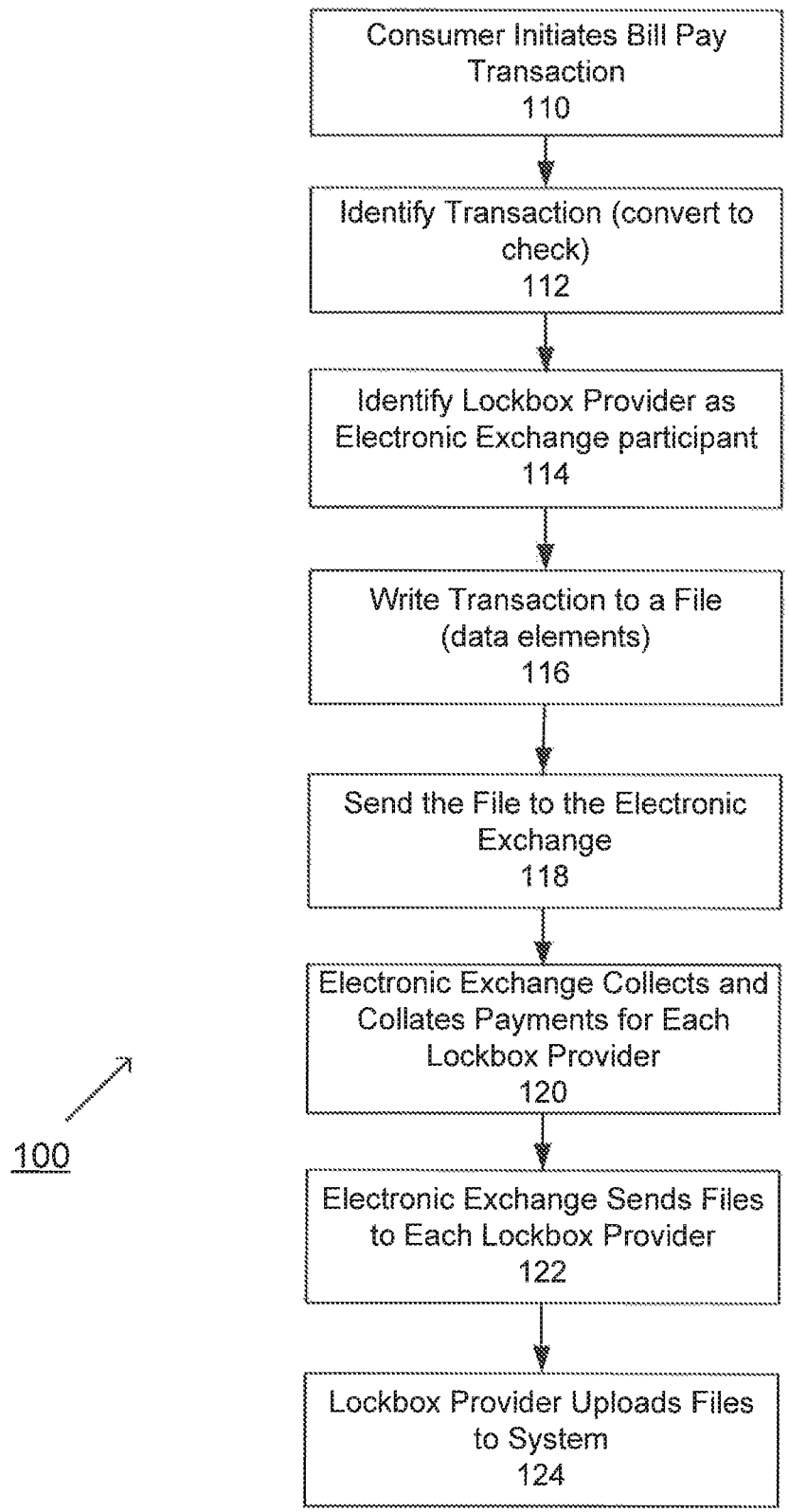
FIG. 1 is an exemplary flow illustrating an electronic exchange for bill pay transactions, according to an embodiment of the present invention.

FIG. 1 is an exemplary flow illustrating an electronic exchange for bill pay transactions, according to an embodiment of the present invention. At step 110, a customer initiates a bill pay transaction. At step 112, the transaction may be identified as one that is to be converted to a check. This may be done by the bill payer. At step 114, the payment may be identified as being destined for a lockbox provider participating in an Electronic Exchange. At step 116, the transaction may be written to a file with a set of data elements. At step 118, the file may be sent to the Electronic Exchange from the bill payer provider. At step 120, the Electronic Exchange may then collect and collate the payments destined for each lockbox provider participant. This may include bank, third party and/or corporate lockbox participants. At step 122, the Electronic Exchange may send daily (or other periodic) files to each lockbox provider. This may include options on how the financial transaction is processed. For example, options may include a one lump sum daily total payment accompanied by the data file that breaks down the distribution of funds, check images to be processed as ICLs (image cash letters), or converted to Automated Clearing House (ACH). ACH represents an electronic network for financial transactions. The ACH network facilitates electronic money transfers and automatic payments between banks and financial institutions. At step 124, the data files and the payment files may be received and uploaded into each lockbox provider's systems. The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Figure 2:
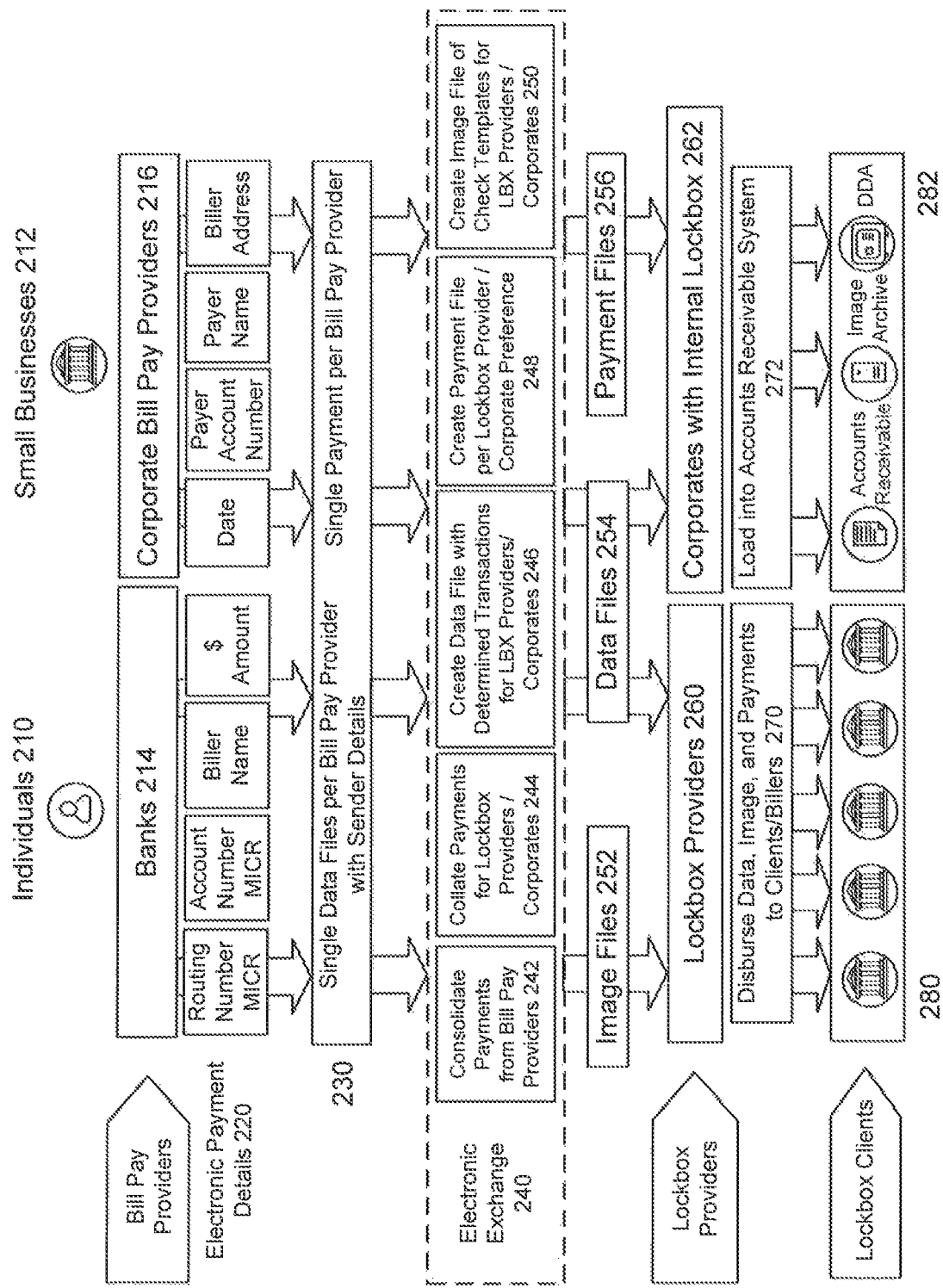
FIG. 2 is an exemplary flow illustrating an electronic exchange for bill pay transactions, according to an embodiment of the present invention.

FIG. 2 is an exemplary flow illustrating an electronic exchange for bill pay transactions, according to an embodiment of the present invention. An embodiment of the present invention is directed to eliminating physical checks sent by Bill Pay providers to Lockbox providers resulting in faster and more efficient deposit into client accounts, improved management of payment exceptions, and reduction in overall operating cost.

Bill Pay providers send paper checks to physical Lockbox providers across the industry. This process generates operational cost for both sides of the payment transactions (e.g., postage fees, sorting and processing of paper checks, etc.). Internally, a financial institution may send paper checks to a lockbox for specific reasons, including inability to process e-payment for e-Lockbox clients due to incorrect payment information. In addition, paper checks may be needed for lockbox clients that are not subscribed to an electronic service, such as e-Lockbox or ACH Direct Send.

An embodiment of the present invention is directed to providing a centralized hub to enable banking participants (e.g., bill payers and lockbox providers) to compress, net and process payments. Banking participants may also generate related data files and provide exception management capabilities. With the various features of an embodiment of the present invention, the system may eliminate physical check exchange between bill pay providers and lockbox providers leading to increased cycle time for processing electronic payments. Additional benefits may include reduction in paper, resource savings, client benefits (e.g., faster deposits to clients' accounts and lower fees), standard industry operating model (e.g., streamline payables and receivables processes with industry participants) and improved exception management (e.g., improved handling of exceptions via auto-matching reduces impact of errors across the industry).

As shown in FIG. 2, a bill pay client may initiate an electronic payment. Bill pay clients may include individuals 210 and small businesses 212 as well as other entities. Bill Pay Providers may include banks and financial institutions represented by 214 as well as corporate bill pay providers and other providers represented by 216. Electronic payment details 220 may include a combination of payment data such as routing number, account number, biller name, an amount, date, payor account number, payer name, bill address and/or other payment data. A single data file 230 per bill pay provider with sender details may be received by an Electronic Exchange, represented by 240. Data file 230 may represent a single file or other consolidated file or format.

Electronic Exchange 240 may process the incoming data and files. This may involve consolidating payments from bill pay providers represented by 242 as well as collating payments for lockbox providers and/or corporates represented by 244. Electronic Exchange 240 may further create a data file with determined transactions for lockbox providers and/or corporates, represented by 246. Electronic Exchange 240 may create a payment file per lockbox provider and/or corporate preferences represented by 248. In addition, Electronic Exchange 240 may create an image file of check templates for lockbox providers and/or corporates, represented by 250. Electronic Exchange 240 may output various files and types of files including Image Files 252, Data Files 254, Payment Files 256 and/or other files to Lockbox Providers 260, 262. Lockbox Providers 260 may also include corporate entities with internal lockboxes represented by 262. Other providers may be supported. Lockbox Providers may then disburse data, image and/or payments to clients and/or billers, as shown by 270. In addition, Lockbox Providers may load data to a corresponding Accounts Receivable System, as shown by 272. Lockbox clients may be represented at 280 and may also include accounts receivable, image archive and demand deposit account (DDA) represented by 282.

Figure 3:
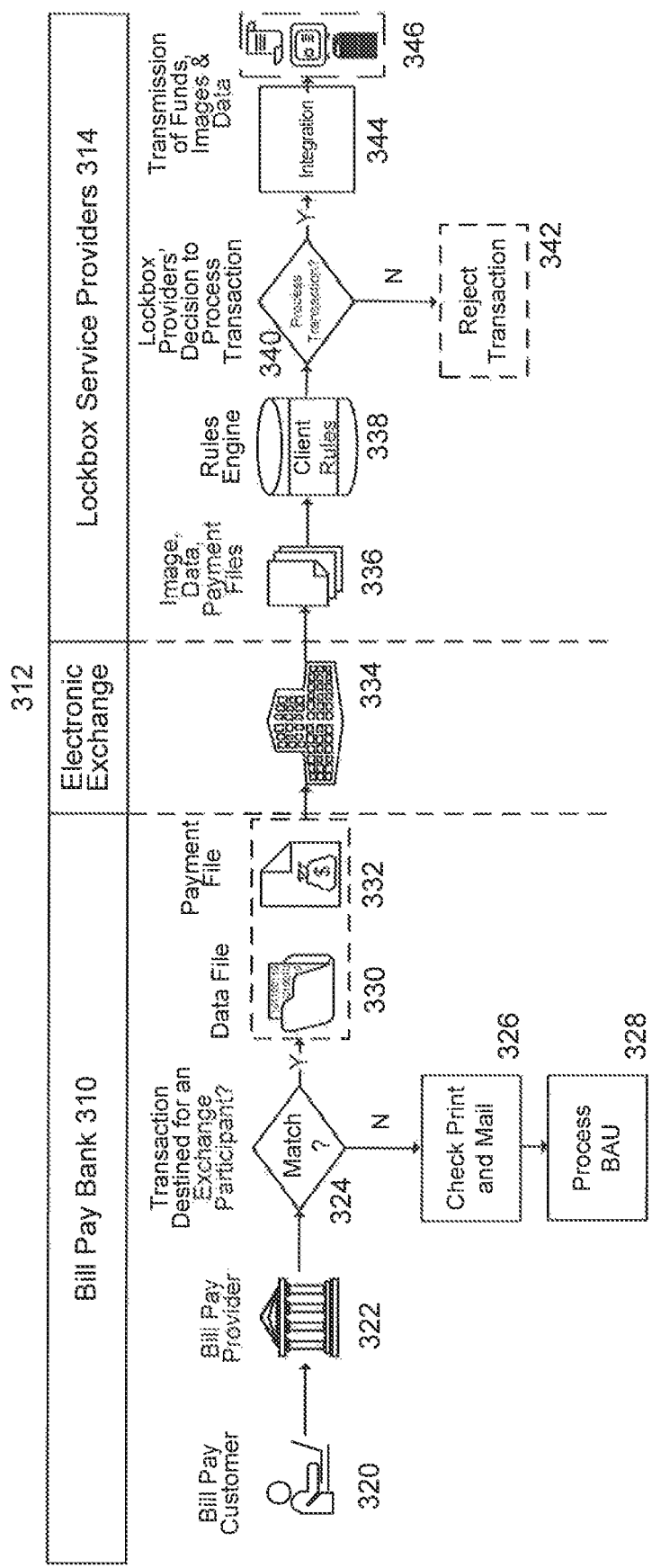
FIG. 3 is an exemplary flow illustrating an electronic exchange for bill pay transactions, according to an embodiment of the present invention.

FIG. 3 is an exemplary flow illustrating an electronic exchange for bill pay transactions, according to an embodiment of the present invention. FIG. 3 illustrates an exemplary interaction between Bill Pay Bank 310, Electronic Exchange 312 and Lockbox Service Providers 314. As shown in FIG. 3, bill pay customer 320 may access a user interface, such as a website, portal and/or other interactive interfaces. The customer may enter information, such as biller name, address, zip code, account number or identifier and an amount. This information may also be electronically received from a source system. The interface may determine if the payment is to be transmitted electronically or converted into a physical check. For example, Bill Pay Provider 322 may initiate a conversion into a physical check under various scenarios, including the biller is not enrolled in an Electronic Biller Directories ("E-Lockbox") or data entered is not an exact match to the Biller Profile (e.g., Aliases, Addresses, Account Number Format, etc.).

At step 324, an embodiment of the present invention may determine whether the transaction is destined for an exchange participant. For example, this may involve determining whether the destination address (or other identifier) matches an exchange participant. If not, the transaction may proceed to a check print where the physical check may be mailed out at 326. Lockbox Providers may then the process check as business as usual (BAU) at 328.

If the transaction is destined for an exchange participant, the process may generate a data file at 330 and a payment file at 332. For example, the system may write the transaction to a file to send to Electronic Exchange 312. Data File 330 file may include various fields, such as Biller Name, Address, Lockbox Provider, Lockbox/Biller Address, Payer Account number, Payer Name, etc. Payment File 332 may correspond to Data File 330 and may include payment instructions, e.g., ACHII, lump sum wire with Distributed Ledger and Blockchain, etc.

Figure 4:
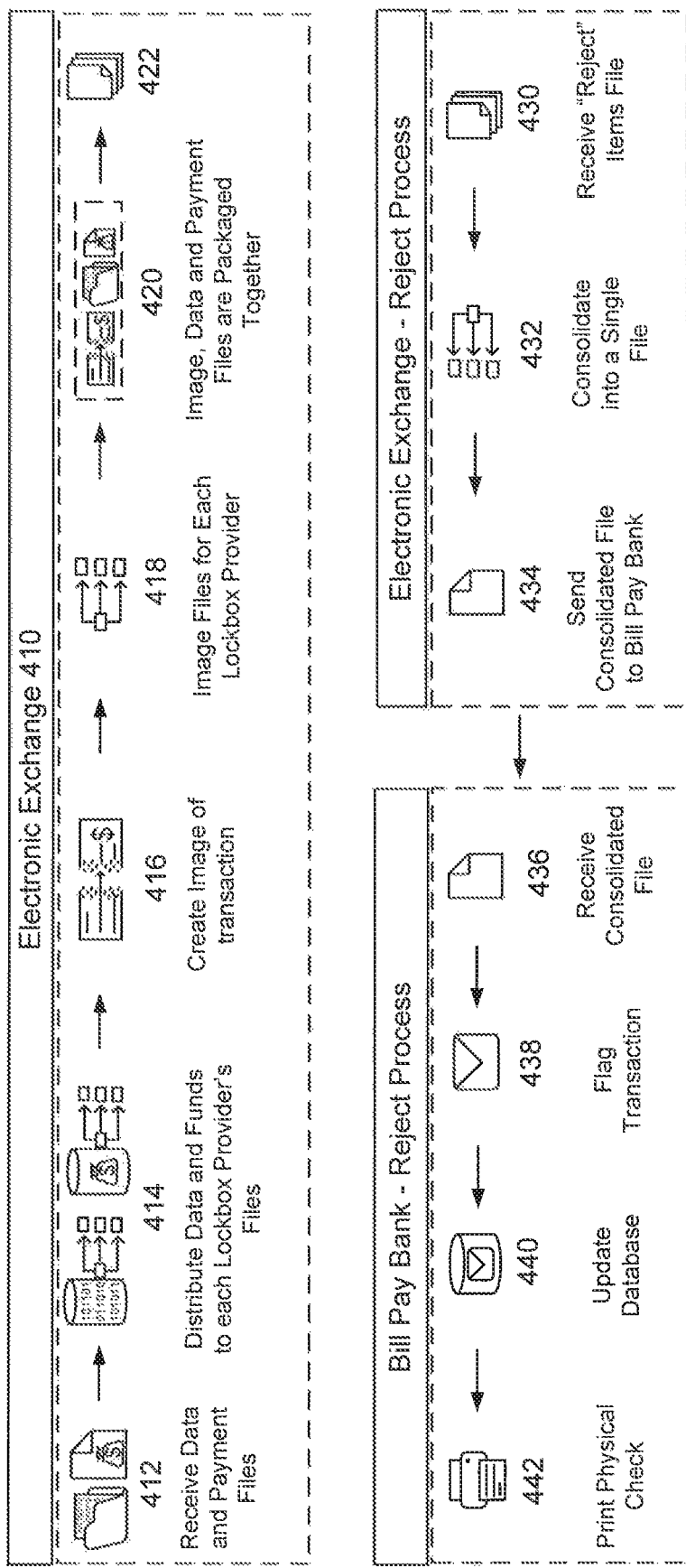
FIG. 4 is an exemplary flow illustrating an electronic exchange for bill pay transactions, according to an embodiment of the present invention.

Electronic Exchange 312 may receive data and payment files, at 334. Additional details are shown in FIG. 4.

Lockbox Service Providers 314 may receive image, data and payment files at 336. For example, files may be received by Lockbox Service Providers and loaded into Lockbox Platforms. Rules Engine 338 may be applied for each box. For example, rules may relate to Stop/Go files, "Do Not Process" Exceptions, etc. Rules may also include provider preferences, templates, formatting instructions, etc.

An embodiment of the present invention may then determine whether to process the transaction at 340. If no, the process may reject the transaction at 342. This may include writing the transaction to a daily reject file, including some or all data elements and a reject reason. The process may then send the file back to Electronic Exchange 312. Additional details are shown in FIG. 4.

If yes, the process may proceed to an integration step into Lockbox daily processing activities as shown by 344 and 346. Processing activities may include various actions including writing to client report, crediting a client's DDA and uploading images to a client portal and/or file.

FIG. 4 is an exemplary flow illustrating an electronic exchange for bill pay transactions, according to an embodiment of the present invention. Electronic Exchange 410 may receive data and payment files from multiple Banks and/or Bill Payers at 412. The Electronic Exchange may then distribute data and funds to each participating lockbox service provider's files at 414. The Electronic Exchange may create images of each transaction in the form of a non-negotiable check, where the image may be used for reference at 416. Image templates may vary based on participant requirements, preferences, etc. At 418, image files may be created for each participating lockbox provider. Image files may be corresponded and indexed to each data file. At 420, Image, Data, and Payment files may be packaged together. The Exchange may then send out daily files (or at other interval) to participating lockbox service providers at 422.

An embodiment of the present invention may be directed to processing a rejection. For example, the Electronic Exchange may receive a "reject" items file from Lockbox Providers at 430. The Electronic Exchange may consolidate the rejects into one file for each Bill Pay Bank at 432. The Electronic Exchange may send the consolidated file to Bill Pay Bank at 434. The Bill Pay Bank may receive the consolidated file at 436. The Bill Pay Bank may flag a transaction to be routed to check print process at 438. Bill Pay Bank may update a database to flag payers, billers, transactions, etc. For example, a payer and/or biller may be marked as ineligible for future electronic payments at 440. Other restrictions and/or limitations may be applied. Bill Pay Bank may print physical checks and then mail or transmit to destination lockboxes at 442.

Figure 5:
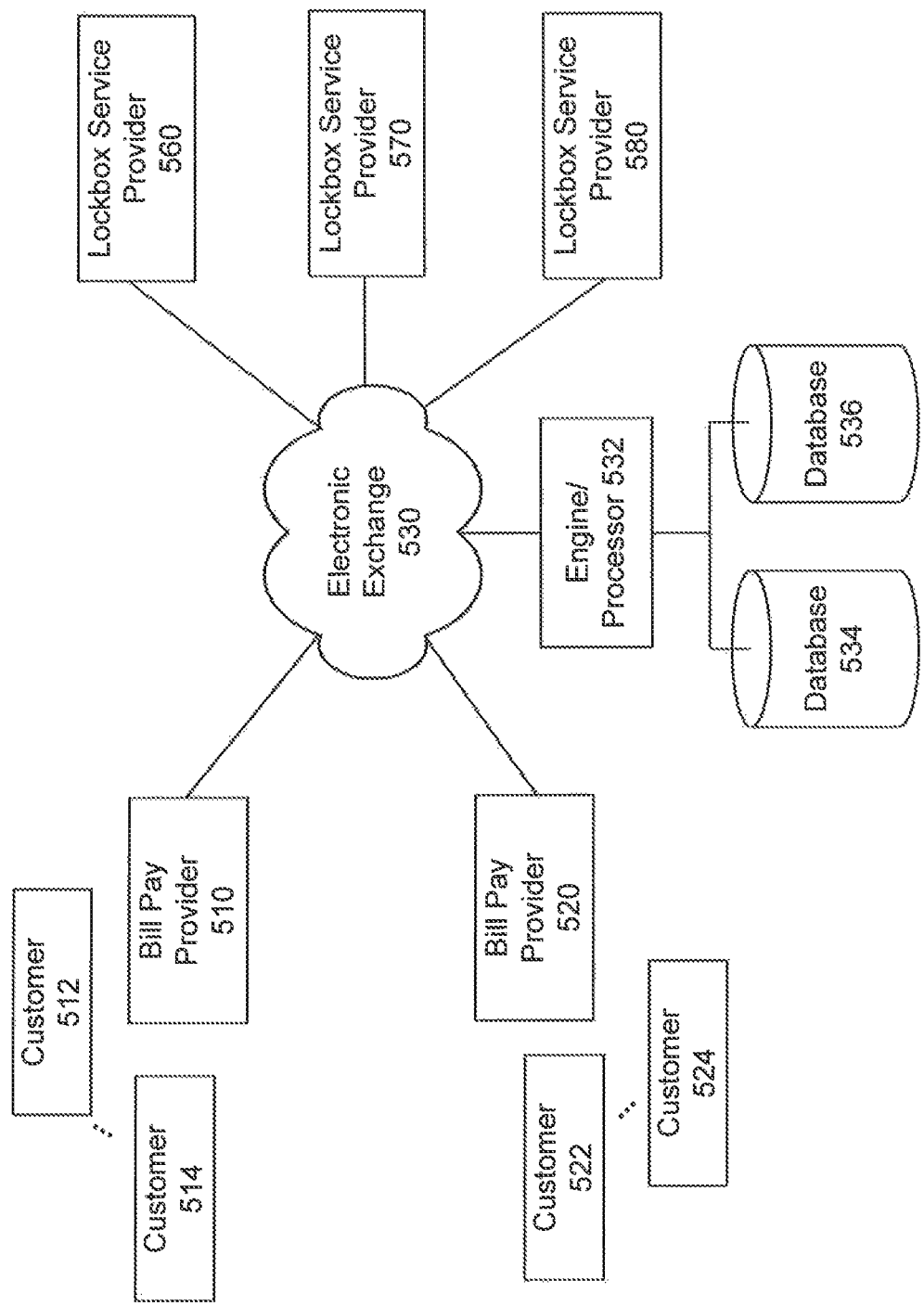
FIG. 5 is an exemplary system diagram illustrating an electronic exchange for bill pay transactions, according to an embodiment of the present invention.

FIG. 5 is an exemplary system diagram illustrating an electronic exchange for bill pay transactions, according to an embodiment of the present invention. As shown in FIG. 5, Electronic Exchange 530 may receive bill pay transactions from one or more Bill Pay Banks and other entities, represented by Bill Pay Providers 510, 520. Bill Pay Provider 510 may have a corresponding set of customers, represented by 512, 514. In a similar manner, Bill Pay Provider 520 may have another corresponding set of customers, represented by 522, 524. Electronic Exchange 530 may provide lockbox services to a plurality of Lockbox Service Providers, represented by 560, 570 and 580. Electronic Exchange 530 may include a processing engine, represented by 532, and one or more storage devices, represented by Database 534, 536.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Those skilled in the art will appreciate that the system diagrams discussed above are merely examples of an Electronic Exchange system and are not intended to be limiting. Other types and configurations of networks, servers, databases, mobile devices, and personal computing devices (e.g., desktop computers, tablet computers, mobile computing devices, smart phones, etc.) may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers and computing devices shown in FIG. 5 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The communications networks in FIG. 5, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, an Asynchronous Transfer Mode (ATM) connection, a Fiber Distributed Data Interface (FDDI) connection, a Copper Distributed Data Interface (CDDI) connection, or an optical/DWDM network.

The communications networks in FIG. 5 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Bluetooth radio link, or an IEEE 802.11-based radio frequency link. The communications network may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, the communication network may comprise a Personal Branch Exchange (PBX), which may further connect to the PSTN.

As described above, FIG. 5 includes a number of computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. FIG. 5 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for implementing an electronic exchange for bill pay transactions, the system comprising:
    an electronic exchange network coupled to a memory component and a computer processor configured to perform, via the electronic exchange network:
    inputting, via an interface, a plurality of payment transactions from one or more bill pay providers on behalf of one or more bill pay clients;
    determining, via an interface for each of the plurality of payment transactions, whether a payment transaction is to be transmitted electronically or converted into a physical check, wherein the payment transaction is determined to be transmitted electronically when the payment transaction is destined for an exchange participant, and the payment transaction is determined to be converted into the physical check when the payment transaction is not destined for the exchange participant;
    when the payment transaction is determined not to be destined for the electronic exchange participant, converting the payment transaction into a physical check by a check printing machine;
    when the payment transaction is determined to be destined for the electronic exchange participant:
        generating electronic data files and payment files representing the plurality of payment transactions, wherein the generating of the electronic data files and payment files includes: creating a data file with determined transactions for each lockbox provider participant, and creating a payment file for each lockbox provider participant including one or more options for digital payment of a lump sum for all determined transactions;
    separating the electronic data files and payment files into a first type of files and a second type of files;
    performing for the first type of files:
        converting the electronic data files and the payment files of the first type of files into the physical check via the check printing machine; and
    performing for the second type of files:
        processing the electronic data files and payment files by consolidating the plurality of payment transactions from the one or more bill pay providers and collating the plurality of payment transactions for one or more lockbox provider participants;
        distributing data and funds to each participating lockbox provider file;
        creating an image of each transaction in the form of a non-negotiable check;
        creating image files for each lockbox provider participant from a plurality of lockbox provider participants, wherein each image file is indexed to each data file;
        consolidating the image files, the data files and the payment files into an electronic package for each lockbox provider participant;
        transmitting, at a predetermined frequency, the electronic package to a respective lockbox provider participant, the electronic package including a plurality of options for processing the electronic package;
        processing, by the respective lockbox provider participant, the electronic package via one of the plurality of options for processing based on a requirement of the respective lockbox provider participant, the processing of the electronic package including an auto-matching process between a payment file from the one or more bill pay providers with information stored by the respective lockbox provider participant, and the one of the plurality of options for processing includes aggregating the electronic data files and payment files of the second type of files into a single file for processing;
        determining whether the electronic package is successfully processed or not by the respective lockbox provider participant based on a communication received from the respective lockbox provider participant;
        when the electronic package is determined to be successfully processed by the respective lockbox provider participant, generating a report of the processed electronic package; and
        when the electronic package is determined to be rejected by the respective lockbox provider participant:
            flagging the electronic package to be routed to a check print process,
            transmitting, the rejected electronic package, to a respective bill pay provider for printing, and
            converting the rejected electronic package into the physical check by the check printing machine.

2. The system of claim 1, wherein the computer processor is further configured to perform applying one or more rules to at least one file in the electronic package.

3. The system of claim 2, wherein the one or more rules are specific to a lockbox provider participant.

4. The system of claim 1, wherein each of the plurality of lockbox provider participants is a distinct and separate lockbox service provider.

5. The system of claim 1, wherein the one or more bill pay clients comprises individual payors and corporate business payors.

6. The system of claim 1, wherein the plurality of lockbox provider participants comprise corporate entities with internal lockbox services.

7. The system of claim 1, wherein the electronic package is received directly into an accounts receivable system associated with the lockbox provider participant.

8. The system of claim 1, wherein the electronic package is automatically processed as image cash letters.

9. The system of claim 1, wherein the electronic package is automatically processed as an Automated Clearing House (ACH) payment.

10. The system of claim 1, wherein the electronic package comprises a lump sum daily total payment file.

11. A method for implementing an electronic exchange for bill pay transactions, the method comprising:
    inputting, via an interface, a plurality of payment transactions from one or more bill pay providers on behalf of one or more bill pay clients;
    determining, via an interface for each of the plurality of payment transactions, whether a payment transaction is to be transmitted electronically or converted into a physical check, wherein the payment transaction is determined to be transmitted electronically when the payment transaction is destined for an exchange participant, and the payment transaction is determined to be converted into the physical check when the payment transaction is not destined for the exchange participant;
    when the payment transaction is determined not to be destined for the electronic exchange participant, converting the payment transaction into a physical check by a check printing machine;
    when the payment transaction is determined to be destined for the electronic exchange participant:
        generating electronic data files and payment files representing the plurality of payment transactions, wherein the generating of the electronic data files and payment files includes: creating a data file with determined transactions for each lockbox provider participant, and creating a payment file for each lockbox provider participant including one or more options for digital payment of a lump sum for all determined transactions;
        separating the electronic data files and payment files into a first type of files and a second type of files;
        performing for the first type of files:
            converting the electronic data files and the payment files of the first type of files into the physical check via the check printing machine; and
        performing for the second type of files:
            processing the electronic data files and payment files by consolidating the plurality of payment transactions from the one or more bill pay providers and collating the plurality of payment transactions for one or more lockbox provider participants;
            distributing, via a computer processor at the electronic exchange network, data and funds to each participating lockbox provider file;
            creating, via the computer processor at the electronic exchange network, an image of each transaction in the form of a non-negotiable check;
            creating, via the computer processor at the electronic exchange network, image files for each lockbox provider participant from a plurality of lockbox provider participants, wherein each image file is indexed to each data file;
            consolidating, via the computer processor at the electronic exchange network, the image files, the data files and the payment files into an electronic package for each lockbox provider participant;
            transmitting, at a predetermined frequency and via the electronic exchange network, the electronic package to a respective lockbox provider participant, the electronic package including a plurality of options for processing the electronic package;
            processing, by the respective lockbox provider participant, the electronic package via one of the plurality of options for processing based on a requirement of the respective lockbox provider participant, the processing of the electronic package including an auto-matching process between a payment file from the one or more bill pay providers with information stored by the respective lockbox provider participant, and the one of the plurality of options for processing includes aggregating the electronic data files and payment files of the second type of files into a single file for processing;
            determining whether the electronic package successfully processed or not by the respective lockbox provider participant based on a communication received from the respective lockbox provider participant;
            when the electronic package is determined to be successfully processed by the respective lockbox provider participant, generating a report of the processed electronic package; and
            when the electronic package is determined to be rejected by the respective lockbox provider participant:
                flagging the electronic package to be routed to a check print process,
                transmitting, the rejected electronic package, to a respective bill pay provider for printing, and
                converting the rejected electronic package into the physical check by the check printing machine.

12. The method of claim 11, further comprising applying one or more rules to at least one file in the electronic package.

13. The method of claim 12, wherein the one or more rules are specific to a lockbox provider participant.

14. The method of claim 11, wherein each of the plurality of lockbox provider participants is a distinct and separate lockbox service provider.

15. The method of claim 11, wherein the one or more bill pay clients comprises individual payors and corporate business payors.

16. The method of claim 11, wherein the plurality of lockbox provider participants comprise corporate entities with internal lockbox services.

17. The method of claim 11, wherein the electronic package is received directly into an accounts receivable system associated with the lockbox provider participant.

18. The method of claim 11, wherein the electronic package is automatically processed as image cash letters.

19. The method of claim 11, wherein the electronic package is automatically processed as an Automated Clearing House (ACH) payment.

20. The method of claim 11, wherein the electronic package comprises a lump sum daily total payment file.

* * * * *